United States Patent
Cao et al.

(10) Patent No.: US 8,514,092 B2
(45) Date of Patent: Aug. 20, 2013

(54) ALARM CIRCUIT FOR FANS

(75) Inventors: Xiang Cao, Shenzhen (CN); Hai-Qing Zhou, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 304 days.

(21) Appl. No.: 13/151,359

(22) Filed: Jun. 2, 2011

(65) Prior Publication Data

US 2012/0268282 A1    Oct. 25, 2012

(30) Foreign Application Priority Data

Apr. 22, 2011    (CN) .......................... 2011 1 0102168

(51) Int. Cl.
*G08B 21/00*    (2006.01)

(52) U.S. Cl.
USPC ........... 340/644; 340/635; 340/648; 340/664; 340/611; 361/695

(58) Field of Classification Search
USPC ............... 340/644, 584, 365, 635, 648, 664; 340/611; 361/695, 679.48, 781; 417/63, 417/22; 374/152, E01.001
See application file for complete search history.

(56) References Cited

U.S. PATENT DOCUMENTS

| | | | | |
|---|---|---|---|---|
| 4,479,115 | A * | 10/1984 | Holzhauer | 340/611 |
| 5,534,854 | A * | 7/1996 | Bradbury et al. | 340/648 |
| 5,790,430 | A * | 8/1998 | Steiert | 340/648 |
| 5,889,469 | A * | 3/1999 | Mykytiuk et al. | 340/635 |
| 6,137,240 | A * | 10/2000 | Bogdan | 315/307 |
| 6,147,615 | A * | 11/2000 | Chen | 340/648 |
| 6,163,266 | A * | 12/2000 | Fasullo et al. | 340/664 |
| 6,255,860 | B1 * | 7/2001 | Chavez et al. | 327/20 |
| 6,674,369 | B1 * | 1/2004 | Riddoch | 340/648 |
| 6,824,362 | B2 * | 11/2004 | Dodson, III | 417/22 |
| 7,852,228 | B2 * | 12/2010 | Teng et al. | 340/648 |
| 2008/0165020 | A1 * | 7/2008 | Chen et al. | 340/648 |
| 2009/0009038 | A1 * | 1/2009 | Hou | 310/68 B |
| 2010/0047082 | A1 * | 2/2010 | Teng et al. | 417/63 |
| 2011/0133944 | A1 * | 6/2011 | Homer et al. | 340/635 |
| 2012/0099287 | A1 * | 4/2012 | Wu et al. | 361/781 |
| 2012/0155016 | A1 * | 6/2012 | Sun et al. | 361/679.48 |
| 2012/0268282 | A1 * | 10/2012 | Cao et al. | 340/644 |
| 2012/0286686 | A1 * | 11/2012 | Watanabe et al. | 315/224 |

* cited by examiner

*Primary Examiner* — Hoi Lau
(74) *Attorney, Agent, or Firm* — Altis Law Group, Inc.

(57) ABSTRACT

An alarm circuit is for a fan. The alarm circuit includes a direct current converting circuit, a first electronic switch, a second electronic switch, a clock chip, and a light emitting diode. When the fan does not operate, the light emitting diode blinks to warn the user that the fan may have a problem.

7 Claims, 1 Drawing Sheet

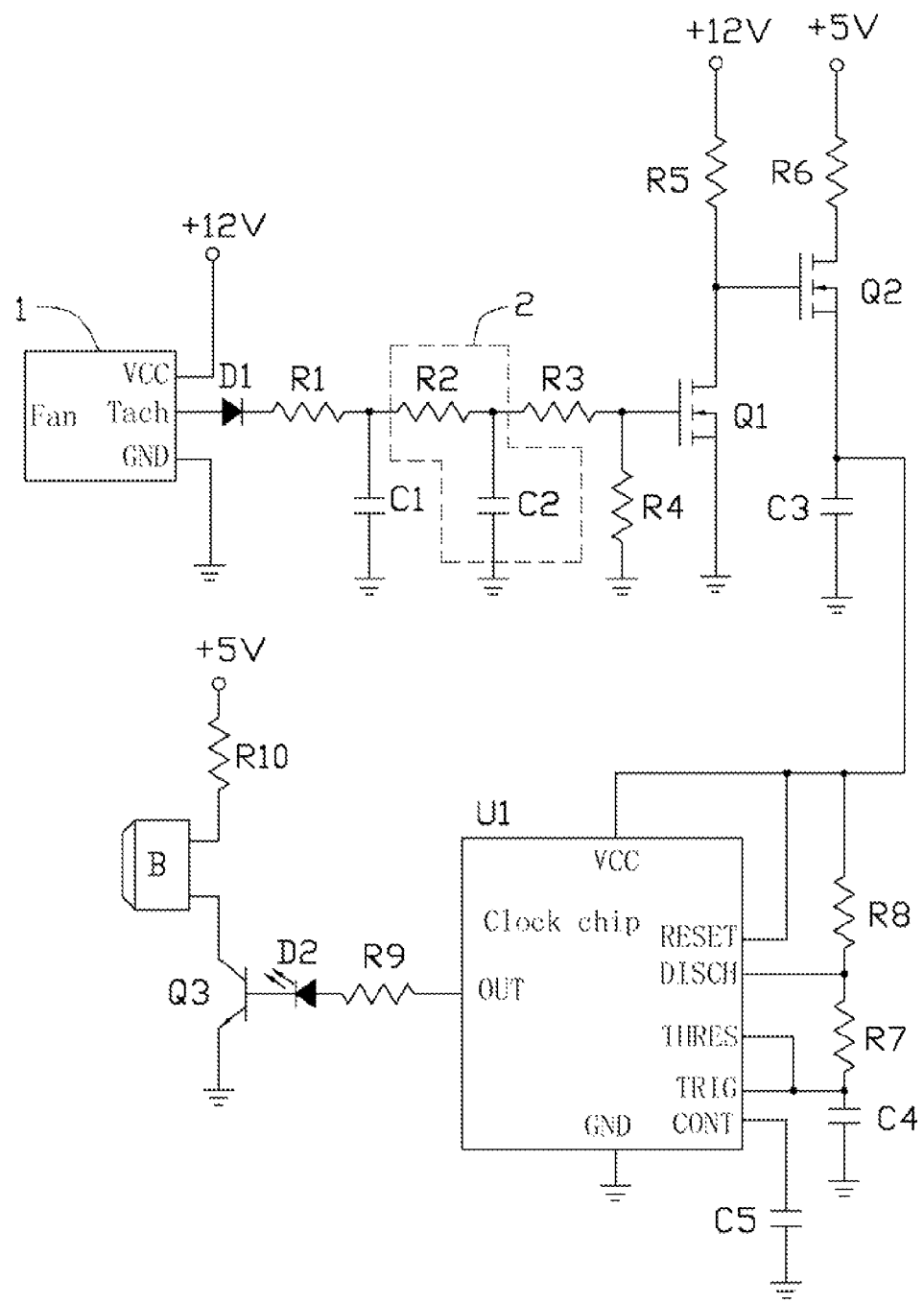

ALARM CIRCUIT FOR FANS

BACKGROUND

1. Technical Field

The present disclosure relates to an alarm circuit for a fan.

2. Description of Related Art

During operation of a computer, heat is generated by electrical components of the computer. High-speed processing by data storage systems results in a great amount of heat being generated. Thus, cooling of the data storage systems is an important consideration in designing computers. In a case that the fans in the data storage systems are not operating, the data storage systems may be at risk.

BRIEF DESCRIPTION OF THE DRAWING

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

The FIGURE is a circuit diagram of an exemplary embodiment of an alarm circuit for a fan.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Referring to the FIGURE, an alarm circuit is connected to a fan 1, to monitor the fan 1, and warn users when the fan 1 is not operating. The fan 1 includes a power pin VCC, a ground pin GND, and a speed pin Tach. The power pin VCC is connected to a first power supply +12V. The ground pin GND is grounded. The speed pin Tach is connected to the alarm circuit.

An exemplary embodiment of the alarm circuit includes a diode D1, three transistors Q1, Q2, and Q3, a clock chip U1, a light emitting diode (LED) D2, and a buzzer B.

An anode of the diode D1 is connected to the speed signal Tach of the fan 1. A cathode of the diode D1 is connected to a gate of the transistor Q1 through three resistors R1, R2, and R3 in that order. A node between the resistors R1 and R2 is grounded through a capacitor C1. A node between the resistors R2 and R3 is grounded through a capacitor C2. A node between the resistor R3 and the gate of the transistor Q1 is grounded through a resistor R4.

A source of the transistor Q1 is grounded. A drain of the transistor Q1 is connected to the first power supply +12V through a resistor R5. The drain of the transistor Q1 is further connected to a gate of the transistor Q2. A source of the transistor Q2 is grounded through a capacitor C3. A drain of the transistor Q2 is connected to a second power supply +5V through a resistor R6.

The source of the transistor Q2 is further connected to a power pin VCC and a reset pin RESET of the clock chip U1. A trigger pin TRIG and a threshold pin THRES of the clock chip U1 are connected to the source of the transistor Q2 through resistors R7 and R8 in that order. The trigger pin TRIG and the threshold pin THRES of the clock chip U1 are also grounded through a capacitor C4. A control pin CONT of the clock chip U1 is grounded through a capacitor C5. A discharge pin DISCH of the clock chip U1 is connected to a node between the resistors R7 and R8. A ground pin GND of the clock chip U1 is grounded. An output pin OUT of the clock chip U1 is connected to an anode of the LED D2 through a resistor R9. A cathode of the LED D2 is connected to a base of the transistor Q3. An emitter of the transistor Q3 is grounded. A collector of the transistor Q3 is connected to a negative terminal of the buzzer B. A positive terminal of the buzzer B is connected to the second power supply +5V through a resistor R10.

When the fan 1 operates, the speed pin Tach of the fan 1 outputs pulse signals. The pulse signals are converted to direct current voltages by a direct current converting circuit 2 which includes the resistor R2 and the capacitor C2. At this time, the gate of the transistor Q1 receives a high level signal. The transistor Q1 is turned on. The transistor Q2 is turned off. As a result, the clock chip U1 cannot receive power to work. The LED D2 and the buzzer B are not activated.

When the fan 1 does not operate, the speed pin Tach of the fan 1 does not output pulse signal. At this time, the gate of the transistor Q1 cannot receive a high level signal. The transistor Q1 is turned off. The transistor Q2 is turned on. As a result, the clock chip U1 is activated. At the same time, the second power supply +5V charges the capacitor C4 through the resistors R8 and R7. According to the characteristic of the clock chip U1, when a voltage at the trigger pin TRIG of the clock chip U1 (namely a voltage at the capacitor C4) equals to two thirds of a voltage at the power pin VCC of the clock chip U1, the output pin OUT of the clock chip U1 outputs a low level signal. Moreover, the discharge pin of the clock chip U1 is turned on, the capacitor C4 discharges through the resistor R7. When a voltage at the capacitor C4 equals to a third of the voltage at the power pin VCC of the clock chip U1, the output pin OUT of the clock chip U1 outputs a high level signal, and the discharge pin of the clock chip U1 is turned off. In this way, the clock chip U1 outputs periodic pulse signals.

When the output pin OUT of the clock chip U1 outputs a high level signal, the LED D2 is activated. The transistor Q3 is turned on. As a result, the buzzer B is activated. When the output pin OUT of the clock chip U1 outputs a low level signal, the LED D2 is not activated. The transistor Q3 is turned off. As a result, the buzzer B is not activated. In this way, the LED D2 blinks, and the buzzer B sounds alternately, to warn the user that the fan 1 may have a problem. In the embodiment, a frequency of the LED D2 blinking and a frequency of the buzzer B sounding can be decided by resistances of the resistors R7 and R8, and capacitance of the capacitor C4.

The foregoing description of the exemplary embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. An alarm circuit for a fan, the alarm circuit comprising:
a direct current converting circuit comprising an input connected to a speed pin of the fan, wherein the direct current converting circuit converts pulse signals from the speed pin of the fan to a direct current voltage when the fan operates;
a first electronic switch comprising a first terminal connected to an output of the direct current converting circuit, a second terminal grounded, and a third terminal connected to a first power supply, wherein the first electronic switch is turned on when the first terminal of the first electronic switch receives the direct current voltage from the direct current converting circuit;
a second electronic switch comprising a first terminal connected to the third terminal of the first electronic switch, a second terminal grounded, and a third terminal connected to a second power supply, wherein the second electronic switch is turned off when the first electronic switch is turned on;
a clock chip comprising a power pin connected to the second terminal of the second electronic switch, a reset pin connected to the second terminal of the second electronic switch, a trigger terminal connected to the second terminal of the second electronic switch through a first resistor and a second resistor in series and grounded through a first capacitor, a threshold pin connected to the second terminal of the second electronic switch through the first and second resistors in series and grounded through the first capacitor, and a discharge pin connected to a node between the first and second resistors; and
a light emitting diode comprising an anode connected to an output pin of the clock chip, and a cathode grounded.

2. The alarm circuit of claim 1, wherein the first electronic switch is a transistor, a gate of the transistor is the first terminal of the first electronic switch, a source of the transistor is the second terminal of the first electronic switch, a drain of the transistor is the third terminal of the first electronic switch.

3. The alarm circuit of claim 1, wherein the second electronic switch is a transistor, a gate of the transistor is the first terminal of the second electronic switch, a source of the transistor is the second terminal of the second electronic switch, a drain of the transistor is the third terminal of the second electronic switch.

4. The alarm circuit of claim 1, wherein the direct current converting circuit comprises a third resistor and a second capacitor, a first terminal of the third resistor functions as the input of the direct current converting circuit, a second terminal of the third resistor functions as the output of the direct current converting circuit, the second terminal of the third resistor is further grounded through the second capacitor.

5. The alarm circuit of claim 1, further comprising a diode and a third resistor, wherein an anode of the diode is connected to the speed pin of the fan, a cathode of the diode is connected to the input of the direct current converting circuit through the third resistor.

6. The alarm circuit of claim 1, further comprising:
a third electronic switch comprising a first terminal connected to the cathode of the light emitting diode, a second terminal grounded, and a third terminal, wherein the third electronic switch is turned on when the light emitting diode is turned on; and
a buzzer comprising a positive terminal connected to the second power supply, and a negative terminal connected to the third terminal of the third electronic switch.

7. The alarm circuit of claim 6, wherein the third electronic switch is a transistor, a base of the transistor is the first terminal of the third electronic switch, an emitter of the transistor is the second terminal of the third electronic switch, a collector of the transistor is the third terminal of the third electronic switch.

* * * * *